Mar. 20, 1923.  
M. L. SWAYZE.  
POTATO DIGGER AND BEAN HARVESTER.  
ORIGINAL FILED DEC. 24, 1918.
1,449,306.
3 SHEETS—SHEET 1.
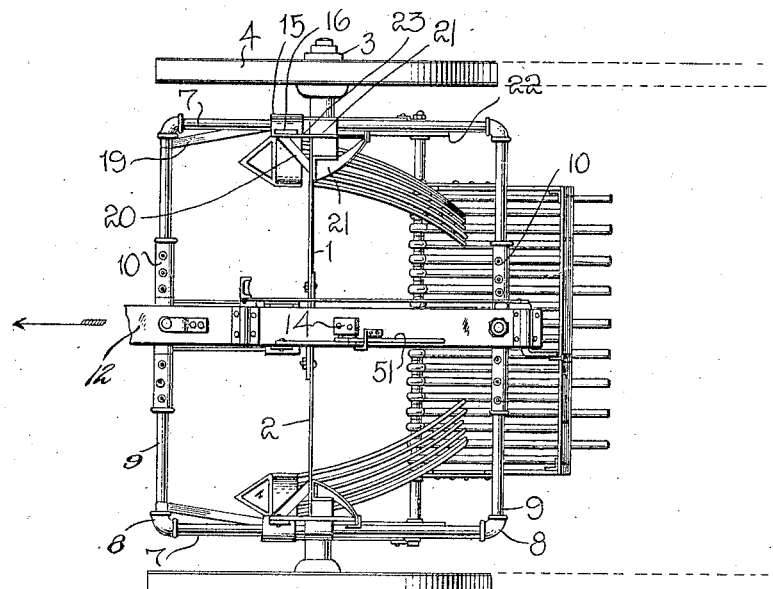
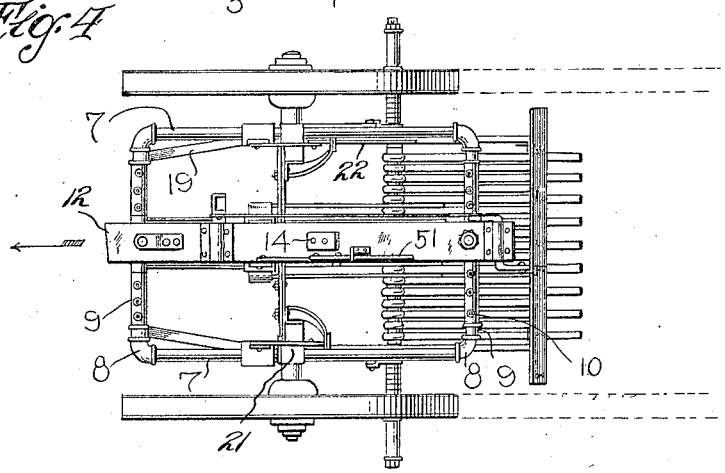
Inventor  
Michael L. Swayze  
By  
Lacey & Lacey, Attorneys

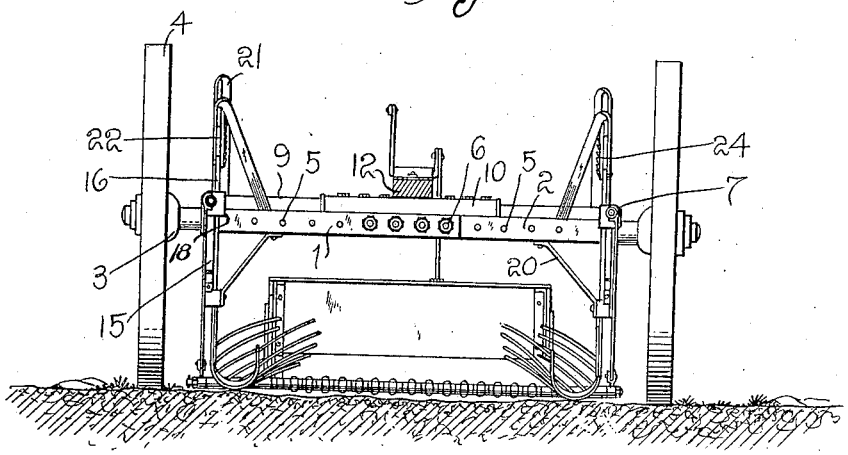
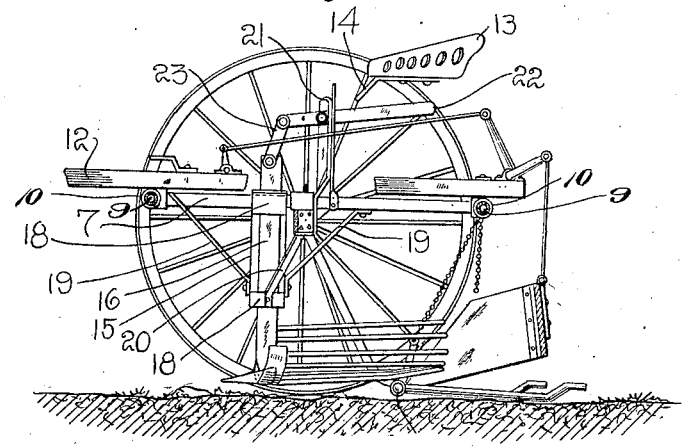

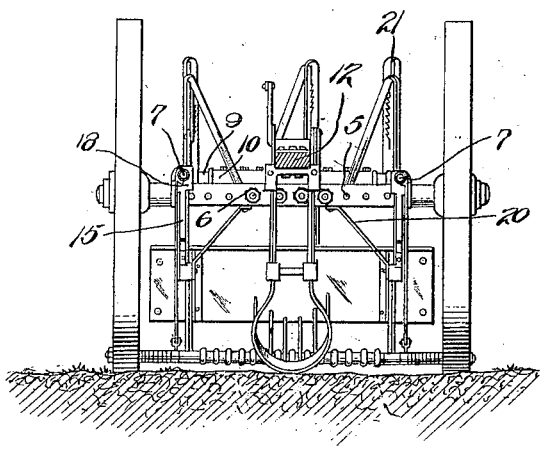

Patented Mar. 20, 1923.

1,449,306

UNITED STATES PATENT OFFICE.

MICHAEL L. SWAYZE, OF PEYTON, COLORADO.

POTATO DIGGER AND BEAN HARVESTER.

Original application filed December 24, 1918, Serial No. 268,137. Divided and this application filed July 16, 1919. Serial No. 311,228.

*To all whom it may concern:*

Be it known that I, MICHAEL L. SWAYZE, a citizen of the United States, residing at Peyton, in the county of El Paso and State of Colorado, have invented certain new and useful Improvements in Potato Diggers and Bean Harvesters, of which the following is a specification.

This application is a division of an application filed by me December 24, 1918, Serial No. 268,137, the present invention relating particularly to the U-shaped frames and the mounting and adjustment of the hangers of the potato digger and harvester.

In the accompanying drawings—

Figure 1 is a plan view of a machine embodying my improvements showing the same arranged for use as a bean harvester and expanded to accommodate widely spaced rows;

Fig. 2 is a transverse section of the same;

Fig. 3 is a longitudinal section thereof;

Fig. 4 is a plan view of the machine arranged for use as a potato digger and showing it contracted so that the ground wheels will pass at opposite sides of the row or hills;

Fig. 5 is a tranverse section of the machine arranged as shown in Fig. 4; and

Fig. 6 is a longitudinal section of the same.

In carrying out my invention, I employ an axle consisting of two bars 1 and 2 which have suitably secured to their outer ends hubs 3 upon which ground wheels 4 are mounted. The inner ends of these axle members or bars overlap, as shown, and are provided with a plurality of perforations or openings 5 through which bolts 6 are passed to secure the axle in extended or contracted adjustment. Upon the outer ends of the axle members, I secure, by any convenient means, the side bars 7 of the main frame and these side bars may conveniently be tubing or rods to the ends of which are secured elbows or couplings 8. The members 9 of the front and rear bars of the frame have their outer ends secured in said couplings and their inner ends are fitted in central sleeves 10 and adjustably held in said sleeves by suitable pins or bolts inserted through registering openings provided in the sleeves and the inner portions of the outer members 9. It will be readily understood that by this construction the frame may be made wider or narrower as may be necessary to adjust the machine to the widths of rows so that it will not be necessary to plant rows at a set distance apart but the owner of the machine may adopt his own standard for spacing the rows and adjust his harvesting machine accordingly when his crop is ready to be gathered. The machine may be drawn over the field by any desired means and I have illustrated a draft pole or tongue 12 secured upon the central members 10 of the front and rear bars of the frame and projecting forwardly therefrom to receive and support draft devices. A seat 13 is carried by a standard 14 secured upon the draft pole or tongue so that the operator may readily guide the draft animals or otherwise control the operation of the machine.

To the side bars of the main frame, I secure hangers 15 which depend from said side bars in advance of the axle and are suitably grooved or channeled to receive standards 16 which carry the knives for severing the vines or bean plants. Eyes or loops 18 are provided at the upper and lower ends of the hangers 15 to guide and sustain the standards 16 against lateral movement and braces 19 extend from the lower ends of the hangers to the adjacent portions of the main frame at the front and rear of the hangers, as clearly shown, so as to sustain the hangers in a vertical position. Additional transverse braces 20 may be provided to connect the lower ends of the hangers with the axle so that all possible movement of the hangers will be prevented and the knives will be held in the true line of the rows from which the beams are being gathered. Posts 21 are provided upon the side bars of the main frame and upon the said posts I fulcrum hand levers 22 which have their front ends connected with the respectively adjacent standards 16 by links 23 so that the knives may be set to run at the proper depth to sever all the plants in the row along which the machine is being drawn. This arrangement of parts, furthermore, will permit the driver to quickly raise or lower the knives so that plants which may have their roots above or below the other plants in the row may be properly severed without stopping the machine. A holding rack 24 will be provided upon each post 21 to be engaged by the adjacent lever 22 so that the lever will be held normally in the position in which it may be set when starting the operation.

My device is free of all complicated arrangements so that it may be manufactured at a low cost and may be readily arranged by an unskilled person for use as a bean harvester or as a potato digger.

Having thus described my invention, what is claimed as new is:

1. A harvester of the class described comprising a frame divided into two U-shaped sections, sleeve members connecting the adjacent ends of said sections and means in said sleeve members for clamping the sections to adjust the width of the frame, axle arms each carrying a wheel and rigidly secured in its respective section, said arms having interengaging elements and means for clamping said elements to correspond to the adjusted width of said frame; a hanger rigidly mounted on each section of said frame, a standard associated with each of said hangers for longitudinal adjustment therein, the lower ends of said standards being adapted for carrying harvesting implements, a lever mounted to oscillate on each of said frame sections and having link connection with the respective standard, and a rack device on each section for the respective lever to hold it together with the standard in set position.

2. A harvester of the class described comprising a rectangular, tubular frame divided into two U-shaped sections, tubular sleeve members connecting the adjacent ends of said sections and means in said sleeve members for clamping the sections to adjust the width of the frame, axle arms each carrying a wheel and rigidly secured in its respective section, said arms having interengaging elements and means for clamping said elements to correspond to the adjusted width of said frame; a hanger rigidly mounted on each section of said frame, a standard associated with each of said hangers for longitudinal adjustment therein, the lower ends of said standards being adapted for carrying harvesting implements, a lever mounted to oscillate on each of said frame sections and having link connection with the respective standard, and a rack device on each section for the respective lever to hold it together with the standard in set position.

In testimony whereof I affix my signature.

MICHAEL L. SWAYZE.